United States Patent [19]

Honkanen et al.

[11] 4,093,486
[45] June 6, 1978

[54] METHOD AND APPARATUS FOR MANUFACTURING AN EVEN LAMINATED PRODUCT BY EXTRUSION

[75] Inventors: Arto Honkanen, Helsinki; Erkki Laiho, Kulloo, both of Finland

[73] Assignee: Pekema OY, Helsinki, Finland

[21] Appl. No.: 717,511

[22] Filed: Aug. 25, 1976

[30] Foreign Application Priority Data

Sep. 4, 1975 Finland .............................. 752496

[51] Int. Cl.² .............................................. B29G 3/02
[52] U.S. Cl. .............................. 156/244.19; 156/269; 156/271; 156/289; 156/497; 156/498; 156/500; 156/516; 156/522; 156/529; 425/215; 425/217
[58] Field of Search ............ 156/244, 259, 260, 267, 156/269, 271, 289, 323, 497, 498, 500, 501, 516, 522, 525, 526, 529, 530; 425/72, 97, 106, 202, 215, 217, 294, 308, 325, 378 R

[56] References Cited

U.S. PATENT DOCUMENTS

| | | | |
|---|---|---|---|
| 1,913,330 | 6/1933 | Brickman | 156/259 |
| 2,928,133 | 3/1960 | Schairer | 425/217 |
| 3,130,647 | 4/1964 | Anderson et al. | 156/244 |
| 3,165,433 | 1/1965 | Markowicz | 156/271 |
| 3,192,293 | 6/1965 | Van Riper | 425/217 |
| 3,340,124 | 9/1967 | Lowe et al. | 156/244 |
| 3,387,322 | 6/1968 | Woellhaf et al. | 425/217 |
| 3,392,076 | 7/1968 | van der Pals | 156/244 |
| 3,448,183 | 6/1969 | Chisholm | 425/307 |
| 3,519,514 | 7/1970 | Ignell et al. | 156/267 |
| 3,551,242 | 12/1970 | Boeke | 156/244 |
| 3,733,160 | 5/1973 | Neil | 425/215 |
| 3,737,354 | 6/1973 | Hattori | 156/244 |
| 3,749,629 | 7/1973 | Andrews et al. | 156/244 |

FOREIGN PATENT DOCUMENTS

| | | | |
|---|---|---|---|
| 1,475,315 | 1966 | France | 156/244 |
| 55,130 | 1967 | Germany | 156/244 |
| 1,101,472 | 1/1968 | United Kingdom | 156/244 |
| 1,367,627 | 9/1974 | United Kingdom | 156/244 |

Primary Examiner—Caleb Weston
Attorney, Agent, or Firm—Pennie & Edmonds

[57] ABSTRACT

Disclosed is a method and an apparatus for manufacturing an even laminated product by extruding a molten thermoplastic coating material track onto a basic-material track. The edge strips of the coating material track are cooled by means of jets of heat absorbing material to keep the said edge strips of coating material from adhering to the basic-material track. The edge strips of each track are then cut off said tracks, chopped separately, and directed separately for recovery.

17 Claims, 4 Drawing Figures

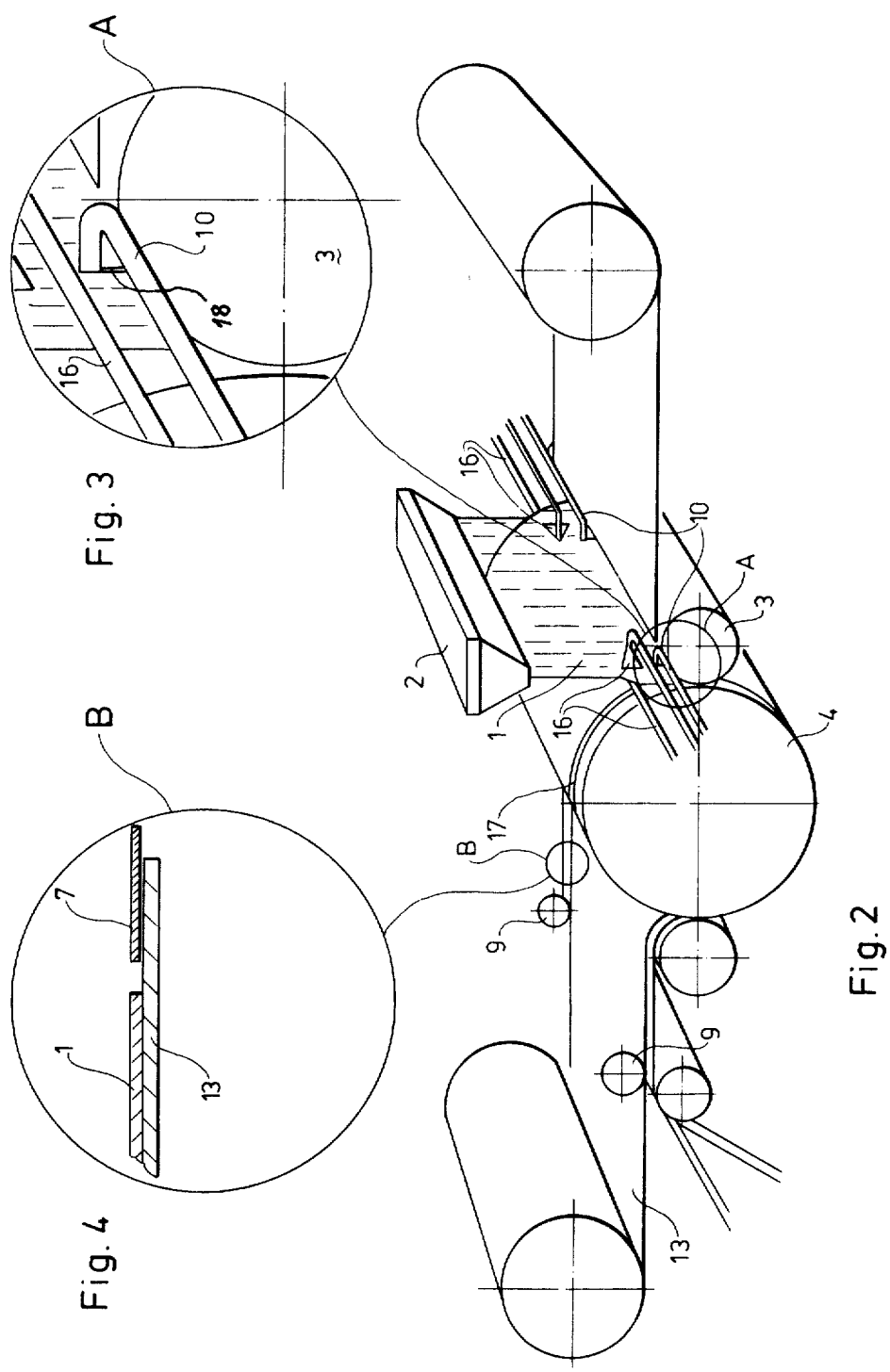

METHOD AND APPARATUS FOR MANUFACTURING AN EVEN LAMINATED PRODUCT BY EXTRUSION

BACKGROUND OF THE INVENTION

The present invention relates to a method for manufacturing an even laminated product by extruding a molten thermoplastic coating-material track onto a track of basic material. The invention also relates to an apparatus for applying the method.

When molten polymer is extruded through a narrow-slitted die onto a track of material which serves as the bearing surface a shrinkage or puckering occurs during cooling due to the internal forces of the polymer, and therefore the final polymer layer on the track is considerably narrower than the die slit. Another consequence of the puckering phenomenon is that the edges of the molten polymer layer are many times thicker than the rest of the polymer layer. The puckering and edge-thickening phenomena cause torsion, thickening of the reel edges, and breakage of either the polymer track or the other tracks in the final product reel. These detrimental phenomena are eliminated in known coating and laminating technology by widening the die through which the melt is extruded to such an extent that the thick polymer edges extend over the bearing track, or by cutting off the track edge strips consisting of coating and basic materials immediately after the coating process and before the final reeling. Also the edges of the reels with the coating extending beyond the edges must be cut in a further treatment, in which case a problem is caused by the coating material sticking to the press roll.

In spite of great efforts to eliminate the puckering and thickening phenomena in the treatment of molten polymer (e.g., shaping of the die slit, air jets, various mechanical knives, coextrusion dies, hot wires, etc.), the cutting of the edge strip cannot be eliminated by existing methods. This cutting for its part, usually results in the strips being wasted. Such waste makes the extrusion coating applications considerably less economical since the strips consist of several layers which cannot be separated and then reused.

If the basic track is of a fibrous material, such as paper or cardboard, and if the tracks could be separated, even if with difficulty, fibers are always left in the polymer strip and prevent its reuse for extrusion. On the other hand, fibrous strips cannot be broken up in a pulper, owing to the polymers present in them, although attempts have been made to develop the method. If, again, the basic track has been some plastic or other film, the layers have usually adhered to each other so that their separation is not profitable. Therefore the strips are usually taken, after cutting and chopping, to a baling station and then to a dump or an incinerator.

SUMMARY OF THE INVENTION

The present invention introduces a method by which the adherence of molten polymer to the basic material is prevented in the edge areas, i.e., in the areas where the plastic is thicker, and thus, after the coating and the cutting, the various materials present in the edge strip can easily be separated and collected in a pure form for reuse. In many cases the polymer can be reused even immediately, along with the normal feed polymer. The characteristics of the method and apparatus according to the invention are disclosed in the enclosed claims.

According to the invention, the molten polymer is cooled in the edge areas to a sufficiently low temperature by means of directed air jets, for example, so that when the different layers are pressed together between the cooling roll and the press roll, the layers do not adhere to each other in the predetermined edge areas. After being cut along an approximately predetermined boundary line the various strip materials can be recovered in pure form. If it is depend at the same stage to separate the edge strip of the coating material at the cutting boundary line, a sharp air, water or other similar material jet is directed just before the coating material adheres to the basic material track at the point in question, which penetrates the coating material and thus cuts the edge strip of the coating material off, which strip can then be directed separately in a pure form for recovery and reuse. The edge strips of the basic material track are thereafter cut off the track by means of the usual cutting members.

BRIEF DESCRIPTION OF THE DRAWING

The invention is described below with reference to the attached drawings in which

FIG. 3 depicts the detail A of the apparatus according to FIG. 2 at a greater scale and FIG. 4 correspondingly a cross section of the tracks at point B of FIG. 2.

DESCRIPTION OF THE PREFERRED EMBODIMENTS

Figure 1:
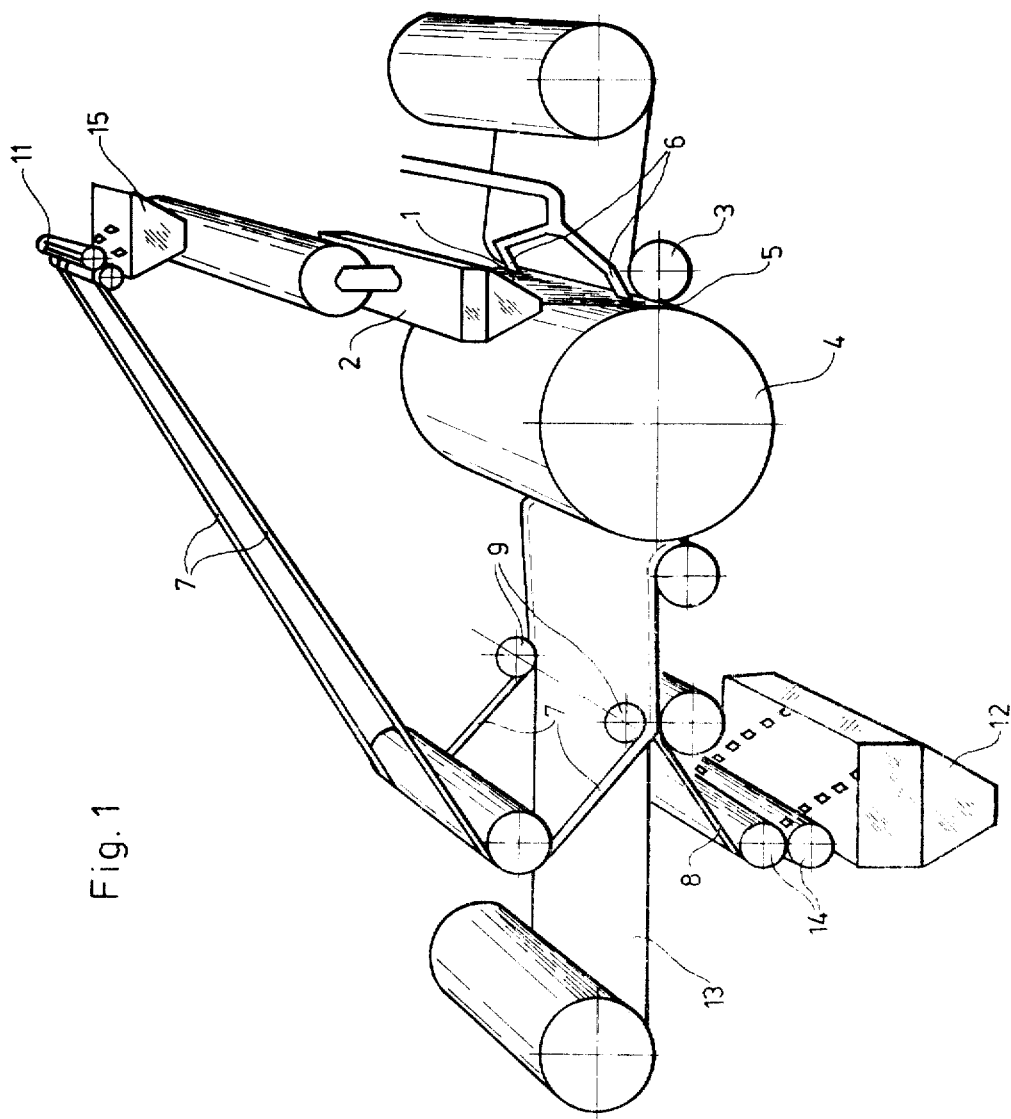
FIG. 1 depicts one simplified embodiment of the apparatus according to the invention and FIG. 2 correspondingly another embodiment.

According to FIG. 1 molten polymer 1 is forced as a thin sheet through a die 2, in a manner known per se, into the gap 5 between the press roll 3 and the cooling roll 4, where the tracks adhere to each other. The thicker polymer edges caused by puckering are avoided since these edges are cooled by means of directed air jets 6 prior to the gap 5 between the rolls so that the edges of the polymer do not adhere to the corresponding edges of the basic material due to the cooling effect of the jets 6 these edge areas are precisely defined. The edge strips 7 of the coating material 1 and the edge strips 8 of the basic material 13 can be separated easily from each other after the known cutting members 9.

It is further indicated in this simplified embodiment how the strips 7 of the polymer are chopped with a chopper 11, directed to a feeding device 15 of the die 2, and reused for coating together with the feed polymer. The strips 8 of the lower track, i.e., the basic material 13, can be directed from the chopper 14 to a collecting container 12 or, if the material is paper or some other fibrous material, conveyed pneumatically into a pulper for reuse.

In the embodiment presented in FIGS. 2 to 4 the sharp air or water jets have been directed by means of dies 10 to the cutting points 18 of the edge strips 7 of the coating material track 1 for cutting the edge strips off the coating material track. The strips 7 can then be directed separately in a pure form for recovery and reuse. The edge strips of the basic material track are thereafter cut off the track by cutting members 9. According to this embodiment the cooling material is led to the edges of the melt track 1 by jets coming from dies 16 placed on both sides of the track. By arranging the dies so that the direction of the jet is outwardly from the direction of the center of the track toward the edges in addition to an effective cooling, an additional advantage is realized in that the puckering phenomena per se diminishes in effect.

In the embodiment according to FIGS. 2 and 4 the cooling roll 4 also has grooves 17, with which the detaching procedure is promoted and the boundary line is made sharper. Also the press roll 3 can have such grooves.

The cutting by members 9 and 10 is performed approximately along the boundary where the coating-material and basic-material tracks adhere to each other. By using various known measuring and guide members the cutting members can be caused always to follow this boundary. The boundary line can also be caused to move along with the cutting members by coupling the cooling air jets to follow any movements of the cutting members.

The effectiveness of the air jets and the sharpness of the boundary of the detached zone can also be improved by various methods, such as die shaping, air quantity control, direction of the air, and pressure control. In addition, cooling the air improves the cooling effect of the jets 6 thus permitting a higher feed rate. It is also possible to use materials which absorbs and holds heat more effectively than air, e.g. vapour.

Naturally the invention is not limited to the above simple embodiment but, for example, blowers can be used to press the melt track against the cooling or press roll or the basic track, before the tracks are joined, depending on whether the basic track is fed from the side of the cooling roll or the press roll or from both sides in the case of laminating. Neither are the uses of the edge strip limited to the examples given above, but they can be treated further in any desired manner.

We claim:

1. A method for manufacturing an even laminated product by extruding a molten thermoplastic coating-material track onto a basic-material track comprising the steps of cooling the edge strips of said coating-material track by means of jets of heat absorbing material to keep said edge strips from adhering to edge strips of said basic-material track, said strips of each of said tracks being cut off said tracks along predetermined boundary lines, chopped separately, and directed separately for recovery.

2. A method according to claim 1 including the steps of chopping and feeding said edge strips of said coating-material track into a coating-material die for reuse, and chopping and directing edge strips of said basic material to a collecting container for reuse.

3. A method according to claim 1 including the step of cooling said edge strips of said coating material by means of directed jets comprising cold air.

4. A method according to claim 1 including the step of adjusting said cutting off of said edge strips of said coating-material track and said basic-material track so that said cutting approximately follows the boundary where said tracks adhere to each other.

5. A method according to claim 1 including the step of following by said cooling jets any shifts in the cutting line.

6. A method according to claim 1 including the step of cutting said edge strip of said coating material track off said coating material track after the commencement of said cooling step by directing at the cutting point just before said coating material adheres to said basic material a second jet of heat absorbing material which penetrates said coating material and thus cuts said edge strip of said coating material track off, and wherein said heat absorbing material is air.

7. A method according to claim 1 including the step of cutting said edge strip of said coating material track off said coating material track after the commencement of said cooling step by directing at the cutting point just before said coating material adheres to said basic material a second jet of heat absorbing material, which penetrates said coating material and thus cuts said edge strip of said coating material track off, and wherein said heat absorbing material is water.

8. A method according to claim 1 including the step of cooling said edge strips of said coating material by means of directed jets comprising a cooling material.

9. A method according to claim 8 including the step of directing said cooling-material jets at both sides of said coating-material track by directing said jets from the center of the track toward the edges.

10. A method for manufacturing an even laminated product by extruding a molten thermo-plastic coating-material track onto a basic-material track comprising extruding said coating-material track, cooling the edge strips of said coating-material track by means of jets of heat absorbing material, said cooling being sufficient to prevent said edge strips from adhering to the corresponding edge strips of the basic-material track, bringing said coating-material track and said basic-material track together subsequent to said cooling, and cutting off the edge strips of said tracks along predetermined lines, whereby puckering of said coating-material track upon cooling is decreased.

11. The method of claim 10 in which said jets are directed toward the edge strips of said coating-material track from the direction of the center of said coating-material track whereby puckering of the coating-material track upon cooling is still further decreased.

12. An apparatus for manufacturing an even laminated product by extruding a molten thermoplastic coating-material track onto a basic-material track, comprising jets of heat absorbing material for cooling the edge strips of said coating-material track, cutting members for cutting said edge strips of said coating-material track and said basic-material track off their respective tracks, conveying members for directing said separate edge strips of each of said tracks to their respective choppers, with arrangements to direct said edge strips of said coating material in pieces from the respective chopper to a feeding device for said coating material and said edge strips of said basic material in pieces from the respective chopper to a collecting container.

13. An apparatus according to claim 12 including cooling roll having grooves for promoting the non-adhesion of said material tracks and for producing an exact boundary line.

14. An apparatus according to claim 12 including press roll having grooves for promoting the non-adhesion of said material tracks and for producing an exact boundary line.

15. An apparatus according to claim 12 comprising dies for directing a sharp air, water or other similar material jet at the cutting point of said edge strip of said coating material track for cutting said edge strip off said coating material track.

16. An apparatus for maufacturing an even laminated product comprising means for moving a basic material track continuously in one direction, a cooling roll and a press roll providing a nip therebetween, said basic material track passing through said nip, means for extruding a coating-material track into said nip, jet means for impinging jets of heat absorbing material against the edge strips of the coating-material track being extruded, said jet means being positioned between said nip and said extruding means whereby said edge strips of said coating-material track are cooled prior to contacting said basic-material track to prevent adhesion of said strips to the edge strips of said basic-material track, and means for cutting the edge strips of said coating-material track and of said basic-material track from their respective tracks.

17. The apparatus of claim 16 including positioning said jet means to impinge against said edge strips from the direction of the center of said coating-material track.

* * * * *